United States Patent [19]

Wilson et al.

[11] Patent Number: 5,113,555
[45] Date of Patent: May 19, 1992

[54] CONTAINER WITH INTERMESHABLE CLOSURE MEMBERS

[75] Inventors: Shari J. Wilson, Minneapolis; Roger H. Appeldorn, White Bear Lake; Robert N. Hamlin, Stillwater, all of Minn.

[73] Assignee: Minnesota Mining and Manufacturing Company, St. Paul, Minn.

[21] Appl. No.: 618,084

[22] Filed: Nov. 26, 1990

Related U.S. Application Data

[63] Continuation of Ser. No. 325,272, Mar. 22, 1989, which is a continuation-in-part of Ser. No. 172,631, Mar. 24, 1988, Pat. No. 4,875,259, which is a continuation of Ser. No. 904,358, Sep. 8, 1986, abandoned.

[51] Int. Cl.$^5$ ............................................. B65D 33/16
[52] U.S. Cl. ............................................. 24/576; 24/587; 383/63
[58] Field of Search ................ 24/575, 576, 577, 578, 24/587, 588; 383/63, 64, 65, 95

[56] References Cited

U.S. PATENT DOCUMENTS

| | | | |
|---|---|---|---|
| Re. 29,331 | 8/1977 | Naito | 138/118 |
| 281,760 | 7/1883 | Gingras . | |
| 595,510 | 12/1897 | Adams . | |
| 983,093 | 1/1911 | Svenson . | |
| 1,212,262 | 1/1917 | Rockwell . | |
| 1,214,261 | 1/1917 | Balbach . | |
| 1,342,979 | 6/1920 | Beitner . | |
| 1,887,913 | 11/1932 | Bell . | |
| 1,954,242 | 4/1934 | Heppenstall | 20/92 |
| 2,144,755 | 1/1939 | Freedman | 24/281 |
| 2,206,223 | 7/1940 | Dearborn | 287/103 |
| 2,435,133 | 1/1948 | Pezzella | 160/84 |
| 2,461,201 | 2/1949 | Ellis | 2/311 |
| 2,487,400 | 11/1949 | Tupper . | |
| 2,499,898 | 3/1950 | Anderson | 24/206 |
| 2,558,357 | 6/1951 | Madsen | 24/ |
| 2,632,894 | 3/1953 | Louis | 2/320 |
| 2,666,466 | 1/1954 | Sharat | 24/576 |
| 2,717,437 | 9/1955 | DeMestral | 28/72 |
| 2,780,261 | 2/1957 | Svec et al. | 150/3 |
| 2,823,721 | 2/1958 | Svec et al. | 24/576 |
| 2,879,018 | 3/1959 | Pence | 248/28 |
| 2,895,753 | 7/1959 | Fentiman | 287/20.3 |
| 2,926,409 | 3/1960 | Perry | 24/217 |
| 3,000,658 | 9/1961 | Sprouse | 287/103 |
| 3,009,235 | 11/1961 | DeMestral | 28/78 |
| 3,039,340 | 6/1962 | Livermont | 81/177 |
| 3,054,434 | 9/1962 | Ausnit et al. . | |
| 3,076,244 | 2/1963 | DeMestral | 24/203 |
| 3,086,899 | 4/1963 | Smith et al. | 154/45.9 |
| 3,101,517 | 8/1963 | Fox et al. | 24/204 |
| 3,108,924 | 10/1963 | Adie | 161/127 |
| 3,173,184 | 3/1965 | Ausnit | 24/ |
| 3,182,345 | 5/1965 | Smith | 15/176 |
| 3,192,589 | 7/1965 | Pearson | 24/204 |
| 3,198,228 | 8/1965 | Naito . | |
| 3,263,292 | 8/1966 | Fekete | 24/206 |
| 3,266,113 | 8/1966 | Flanagan, Jr. | 24/204 |
| 3,325,084 | 6/1967 | Ausnit | 24/576 |
| 3,335,774 | 8/1967 | Reed | 150/5 |
| 3,369,265 | 2/1968 | Halberstadt et al. | 15/22 |
| 3,408,705 | 11/1968 | Kayser et al. | 24/204 |
| 3,545,048 | 12/1970 | Daddona, Jr. et al. | 24/213 |
| 3,577,105 | 5/1971 | Jones, Jr. | 333/95 |
| 3,604,145 | 9/1971 | Zimmerman | 46/25 |
| 3,618,802 | 11/1971 | Yates, Jr. | 215/41 |
| 3,619,395 | 11/1971 | Skendzic | 264/171 |
| 3,625,270 | 12/1971 | Skendzic | 150/3 |

(List continued on next page.)

FOREIGN PATENT DOCUMENTS

| | | |
|---|---|---|
| 1101823 | 4/1955 | France . |
| 1515154 | 1/1967 | France . |
| 2184997 | 7/1987 | United Kingdom . |

*Primary Examiner*—Laurie K. Cranmer
*Attorney, Agent, or Firm*—Gary L. Griswold; Walter N. Kirn; Mark W. Binder

[57] ABSTRACT

A closure for use in joining together container portions to enclose an opening in a container. The closure includes a pair of intermeshable closure members, each having a structured surface. The structured surfaces adhere to each other when brought into contact to secure the container portions together.

9 Claims, 5 Drawing Sheets

U.S. PATENT DOCUMENTS

| | | | |
|---|---|---|---|
| 3,633,642 | 1/1972 | Siegel | 150/3 |
| 3,685,562 | 8/1972 | Ausnit | 150/3 |
| 3,689,346 | 9/1972 | Rowland | 156/245 |
| 3,730,382 | 5/1973 | Heisler | 220/60 R |
| 3,742,663 | 7/1973 | Duskin | 52/145 |
| 3,780,469 | 12/1973 | Hancovsky | 46/25 |
| 3,780,781 | 12/1973 | Uramoto | 150/3 |
| 3,817,420 | 6/1974 | Heisler | 220/60 R |
| 3,827,472 | 8/1974 | Uramoto | 150/3 |
| 3,869,764 | 3/1975 | Umezu | 24/204 |
| 3,899,805 | 8/1975 | McMillan | 24/213 B |
| 3,905,174 | 9/1975 | Heisler | 53/38 |
| 3,955,245 | 5/1976 | Ballin | 24/201 C |
| 4,060,089 | 11/1977 | Nolles | 128/325 |
| 4,093,009 | 6/1978 | Iavarone et al. | |
| 4,123,826 | 11/1978 | Tanka | 24/204 |
| 4,244,683 | 1/1981 | Rowland | 425/143 |
| 4,330,590 | 5/1982 | Vesley | 428/336 |
| 4,403,692 | 9/1983 | Pollacco | 206/223 |
| 4,452,356 | 6/1984 | Dahl | 206/45.32 |
| 4,520,943 | 6/1985 | Nielsen | 220/281 |
| 4,533,042 | 8/1985 | Pollacco | 206/223 |
| 4,576,850 | 3/1986 | Martens | 428/156 |
| 4,581,792 | 4/1986 | Spier | 24/575 |
| 4,731,911 | 3/1988 | Gould | 24/576 X |
| 4,786,190 | 11/1988 | Van Erden et al. | 383/61 |
| 4,792,240 | 12/1988 | Ausnit | 383/63 |
| 4,817,188 | 3/1989 | Van Erden | 24/587 |
| 4,863,286 | 9/1989 | Branson | 24/587 X |
| 4,929,487 | 5/1990 | Tilman et al. | 24/587 X |

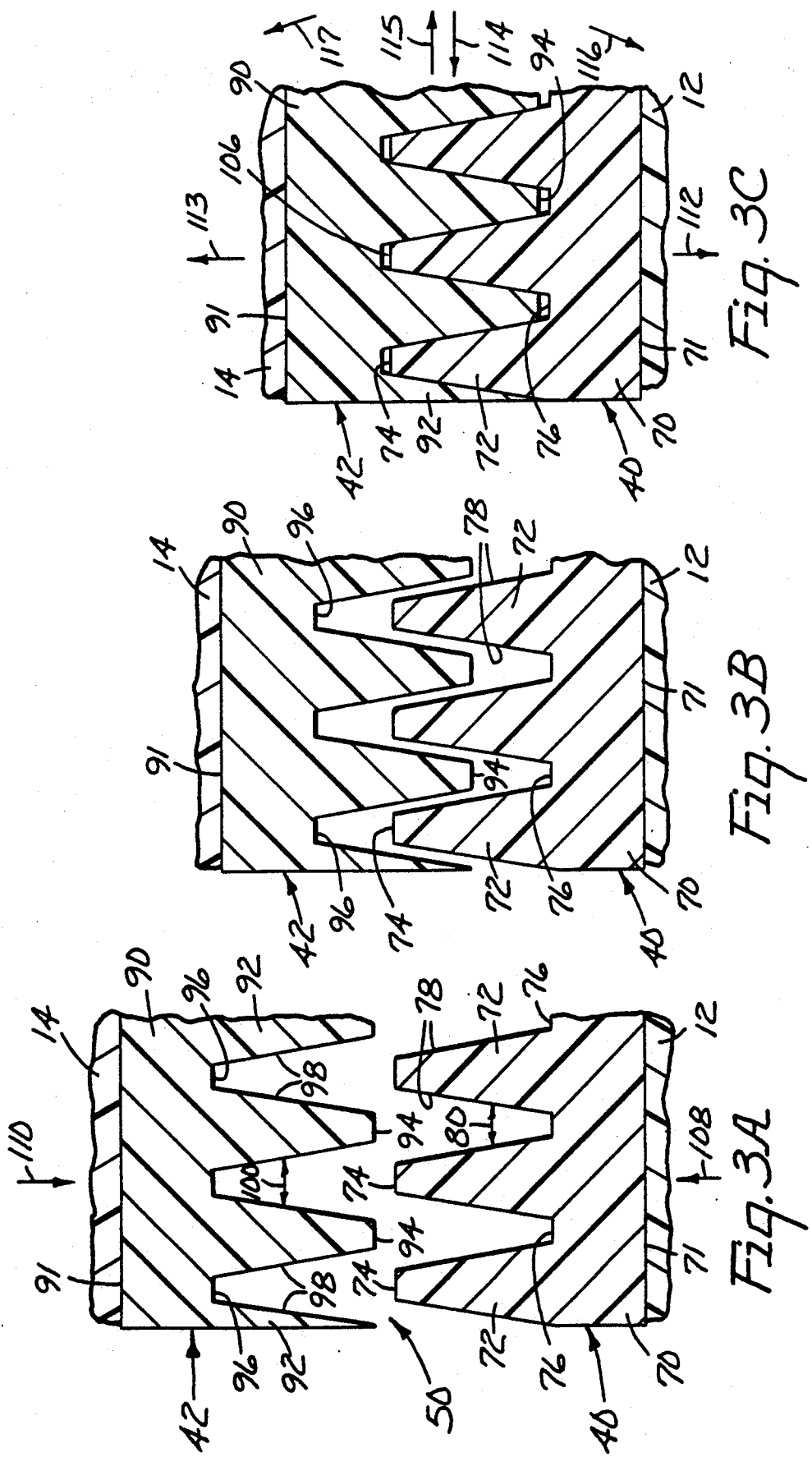

CONTAINER WITH INTERMESHABLE CLOSURE MEMBERS

This application is a continuation of U.S. patent pending application Ser. No. 325,272, filed on Mar. 22, 1989 and entitled "Container With Intermeshable Closure Members", which is a continuation-in-part of U.S. patent application Ser. No. 172,631 filed on Mar. 24, 1988 and entitled "An Intermeshable Article" issued on Oct. 24, 1989 as U.S. Pat. No. 4,875,259, which is a continuation of U.S. patent application Ser. No. 904,358 filed on Sept. 8, 1986 and entitled "An Intermeshable Article", now abandoned.

TECHNICAL FIELD

The present invention relates to containers, and more particularly to containers having means for enclosing an opening in the container.

BACKGROUND ART

In the past, many closures have been developed for enclosing an opening in a container. For the purposes of this invention, the term "container" includes, but is not limited to, flexible bags, boxes, cartons, or any like receptacle having a defined opening providing access to the interior of the container. For instance, containers have been provided with a coating of an adhesive that adheres one portion of the container to another portion of the container to enclose the opening therein.

Adhesives that permanently adhere the container portions together require that the container be damaged in order to open the container. Further, the container may not be reclosed once opened. Closures having pressure sensitive adhesives have also been utilized the enable the container to be opened without damaging the container and also enable the container to be reclosed once opened. Although the pressure sensitive adhesive closures are useful, they exhibit certain undesirable characteristics. For instance, debris or other impediments may become adhered to an exposed surface of the pressure sensitive adhesive and render the adhesive ineffective. This is particularly troublesome in that the contents of a container may inadvertently adhere to the exposed pressure sensitive adhesive surface while being placed within or dispensed from the container. Pressure sensitive adhesives may also lose adhesive strength over long periods of time.

Containers have also been constructed in the past having fasteners or closure members that are mechanically interlocked together. For instance, bags have been constructed of flexible polymeric film and incorporating a Ziploc ™ interlocking closure available from Dow Chemical Co. of Midland, Michigan. Mechanical fasteners such as Ziploc ™, although reusable, are difficult to align when closing. Further, it is difficult to produce thin mechanical interlocking closures.

DISCLOSURE OF INVENTION

The present invention provides a closure for use with a container having an opening providing access to an interior of the container. The container includes a first container portion and a second container portion that enclose the opening when joined together. The closure secures the first container portion and the second container portion together and includes a first intermeshable closure member mounted on the first container portion and a second intermeshable closure member mounted on the second container portion. The first intermeshable closure member and the second intermeshable closure member each have a structured surface. The structured surfaces are brought into contact with each other when the first and second container portions are joined together. Each of the structured surfaces include a plurality of solid tapered elements. Each of the elements have at least one side inclined relative to a common plane at an angle sufficient to form a taper such that each element may mesh with at least one corresponding element of the other of the structured surface when brought into contact with the corresponding element and adhere thereto at least partially because of the frictional force of adherence of the contacting sides. The tangent of the half angle of said tapered sides of said elements is no greater than the coefficient of friction of the material of the contacting sides.

BRIEF DESCRIPTION OF DRAWINGS

The present invention will be further described with reference to the accompanying drawing wherein like reference numerals refer to like parts in the several views, and wherein:

FIG. 3A is an enlarged partial cross sectional view of the intermeshable closure members of FIG. 2 in a disengaged position.

FIG. 3B is an enlarged partial cross sectional view of the intermeshable closure members of FIG. 3A in a partially engaged position.

FIG. 3C is an enlarged partial cross sectional view of the intermeshable closure members of FIGS. 3A and 3B in an engaged position.

DETAILED DESCRIPTION

Figure 1:
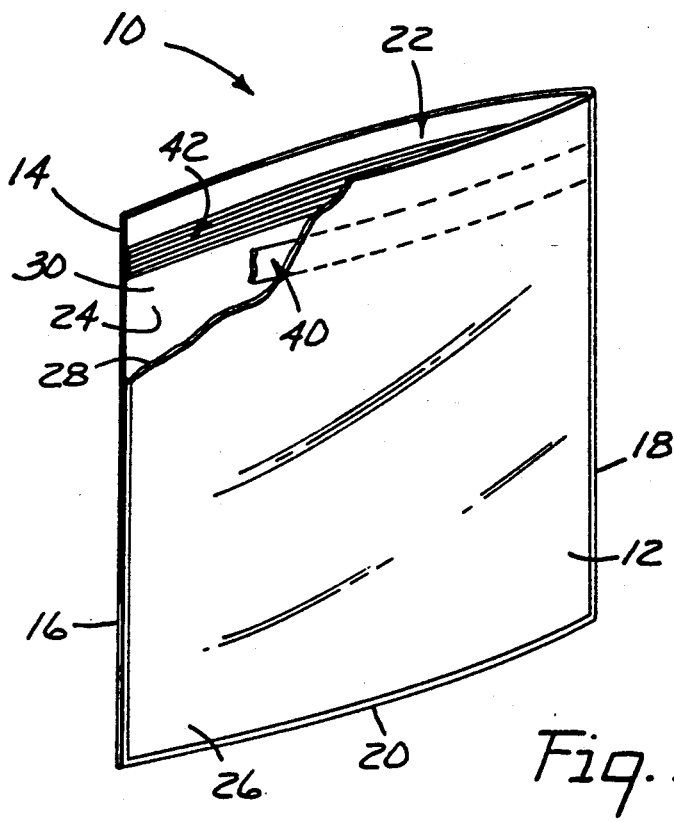
FIG. 1 is an isometric view of a container according to the present invention including intermeshable closure members.
Figure 12:
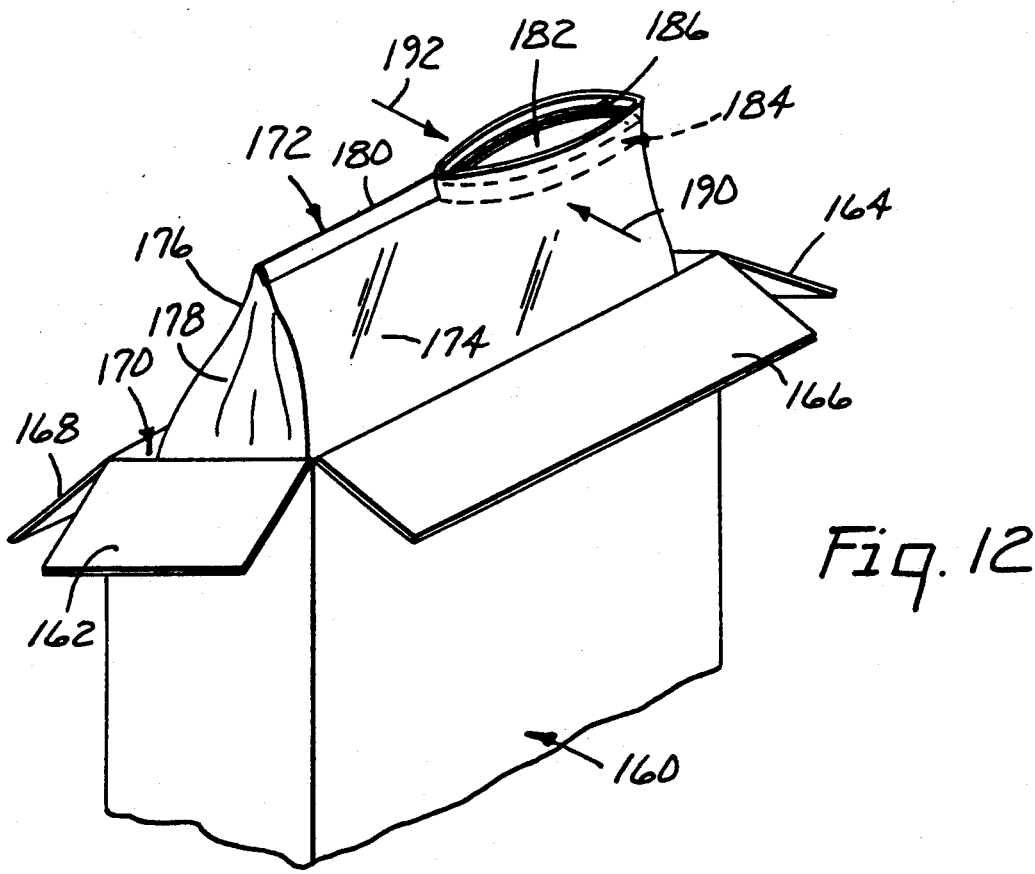
FIG. 12 is an isometric view of a portion of a box containing a flexible bag with intermeshable closure members according to this invention.

Referring now to the drawing, there is shown in FIG. 1 a container according to the present invention generally designated by the reference numeral 10. In the illustrated embodiment, the container 10 is a bag constructed of flexible polymeric film. The bag includes front panel 12 and back panel 14. The front panel 12 and back panel 14 are joined along side edges 16 and 18 and bottom edge 20 to form opening 22 providing access to interior 24 of the bag. For the purpose of this invention, the front panel 12 and back panel 14 may also be considered to be joined to each other if mutually joined to one or more side panels or gussets, such as is shown in FIG. 12 herein.

Figure 2:
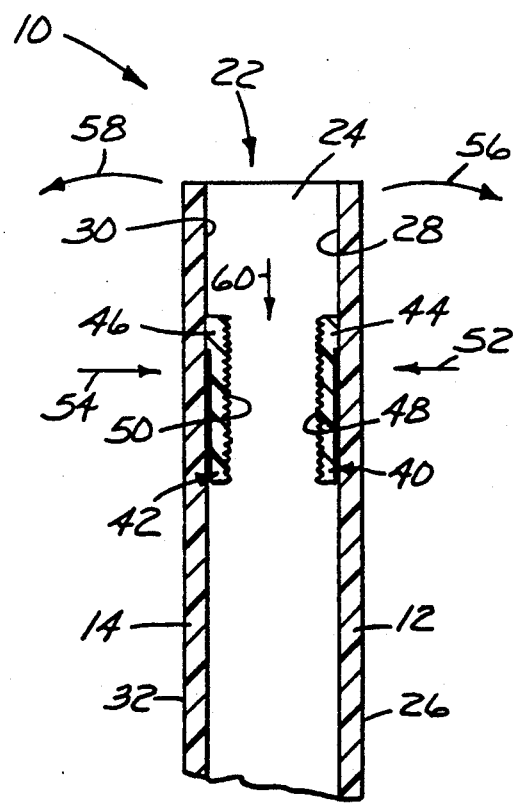
FIG. 2 is an enlarged partial cross sectional view of the container of FIG. 1 with a first embodiment of the intermeshable closure members.

As is shown in more detail in FIG. 2, front panel 12 includes front surface 26 and opposing back surface 28. Back panel 14 includes front surface 30 and back surface 32. First intermeshable closure member 40 mounted on back surface 28 of front panel 12. Second intermeshable closure member 42 is mounted on front surface 30 of back panel 14 aligned with first intermeshable closure member 40.

In the illustrated embodiment, the first and second intermeshable closure members 40 and 42 are provided in the form of strips that extend transversely across the full width of the opening 22 and are mounted to the bag generally along respective longitudinal edges 44 and 46 closest to the opening 22. Any suitable arrangement may be employed to mount the first and second closure members to the bag panels, including, but not limited to, pressure sensitive adhesives, heat welding or bonding, thermoplastic adhesives, ultrasonic bonding, as well as mechanical fasteners.

First intermeshable closure member 40 includes outwardly facing structured surface 48 and second intermeshable closure member 42 likewise includes outwardly facing structured surface 50. Structured surfaces 48 and 50 are intermeshable in a manner to be explained in greater detail hereinafter to secure the first intermeshable closure member to the second member when their respective structured surfaces are brought into contact with each other. The first and second intermeshable closure members thus join the front panel 12 to the back panel 14 of the bag to enclose opening 22 thereof.

A portion of structured surfaces 48 and 50 are shown in greater detail in FIG. 3A. First structured surface 48 of first intermeshable closure member 40 includes base 70 and a plurality of elements 72. Each element 72 includes a ridge 74 and at least one tapered surface 78 inclined at an angle 80 with respect to a common plane parallel to base 70. The angle 80 is the half angle $\beta$ of the angle $\alpha$ included between the oppositely inclined tapered sides of adjacent elements. The opposite surface 71 of the first intermeshable closure member is generally planar and is mounted on back surface 28 of front panel 12. In a similar fashion, second structured surface 50 of second intermeshable closure member 42 includes base 90 and a plurality of elements 92. Each element 92 includes a ridge 94 and at least one tapered surface 98 inclined at an angle 100 with respect to a common plane parallel to base 90. Grooves 96 are formed between each adjacent pair of elements. The opposite surface 91 of the second intermeshable closure member is generally planar and is mounted on front surface 30 of back panel 14.

The sides 78 of each element 72 are inclined at the angle 80 relative to a common plane with all of the elements 72 sufficient to form a taper such that each element will mesh with the sides 98 inclined at a corresponding angle 100 of at least one corresponding element 92 of the second structured surface 50 of the second intermeshable closure member 42. Then when they are brought into contact with one another as progressively shown in FIGS. 3B and 3C, the elements 72 and 92 will adhere to one another at least partially because of the frictional force of adherence between contacting surfaces without macro deformation, or mechanical interference or interlocking of the elements being required. However, it is believed that deformation of any surface irregularities or random micro asperities does take place, but only on a microscopic scale which contributes to adherence by increasing the amount of actual area contact between the surfaces. Thus, it is preferred that the contacting surfaces 78, 98 be physically smooth to decrease macro deformation and to increase adherence for some applications.

The frictional force of adherence between the first and second intermeshable closure member when brought into contact with each other as in FIG. 3C, resists separation of the intermeshable closure members against forces applied in directions 112 and 113 (perpendicular lift off force), as well as forces applied in directions 114 and 115 (shear force) transverse to the directions 108 and 110, and forces applied in rotational directions 116 and 117 (peel forces) if the structured surfaces are constructed of flexible material. The shape, size, spacing and angle of the various elements of the structured surfaces may be arranged to enhance one or more of the resistances to perpendicular lift off, shear and peel forces to adapt the intermeshable closure members for a particular applications. It is one of the features of this invention that the greater the force applied to force the first and second intermeshable closure members together, the greater the resistance of the intermeshable closure members to separation through perpendicular lift off, shear, and peel modes.

In any of the applications of this invention, it has been observed that when the tangent of the half angle $\beta$ is approximately equal to or less than the coefficient of friction $\mu$ of the material of the contacting surfaces, adherence between the first intermeshable closure member and the second intermeshable closure member is substantially increased. Thus, one can utilize the relationship between the coefficient of friction $\mu$ and the total included angle $\alpha$ in designing articles by the following equations:

$$\mu = \frac{L}{H} \quad (1)$$

$$\mu = \tan \frac{\alpha}{2} \quad (2)$$

$$\alpha = 2 \arctan \mu \quad (3)$$

where $$\beta = \frac{\alpha}{2}$$

and the $$\text{slope of the taper} = \frac{L}{H}.$$

Figure 4:
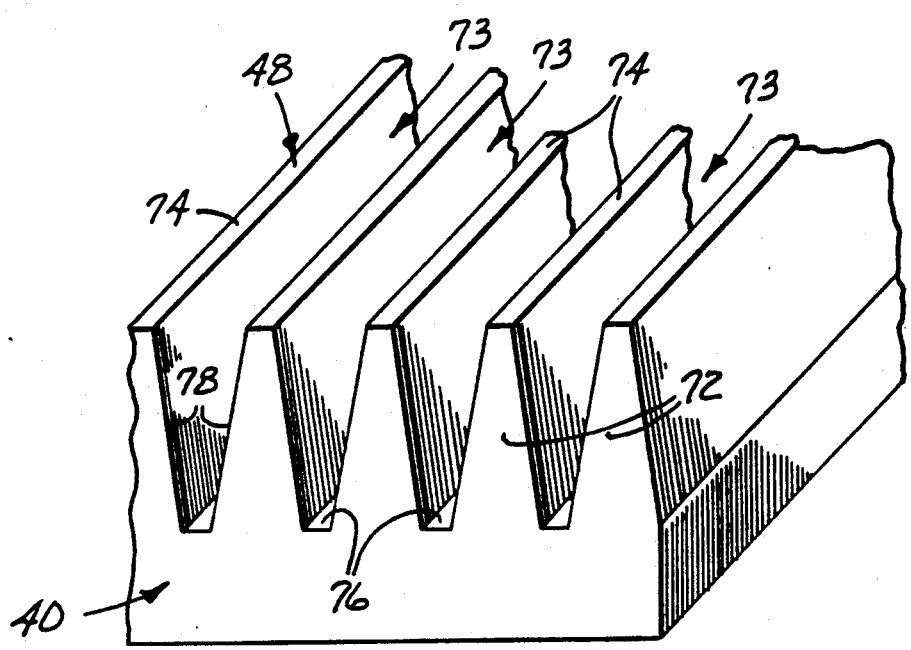
FIG. 4 is an enlarged isometric view of the intermeshable closure members of FIG. 2.

In FIG. 4, an embodiment of the intermeshable closure members is shown wherein the elements extend longitudinally in a parallel row so as to form grooves 73 between adjacent elements.

In the preferred embodiment, as illustrated in FIGS. 3A, 3B, 3C and 4C, each groove between adjacent elements is provided with a trough 76, 96 which separates the adjacent elements. Also, each element 72, 92 is sized such that when the elements are brought into contact with one another to mesh, they will contact each other only along the sides 78, 98 of the elements. This provides a cavity 106, as illustrated in FIG. 3C, and facilitates adherence, the degree of which may vary depending upon the angle of the taper and/or the frictional forces associated with the sides of the intermeshing elements. The cavity 106 insures side contact. Each ridge 74, 94 and trough 76, 96 can touch (not shown) as long as the force associated therewith is not greater than the force associated with the sides 78, 98. That is, the intermeshable closure members of the present invention may be constructed so that their respective ridges and troughs are in contact with each other when the elements of each structured surface are intermeshed. However, the force of contact between the ridges and troughs can not be so great as to diminish or eliminate the frictional force of adherence between the contacting sides.

Figure 5:
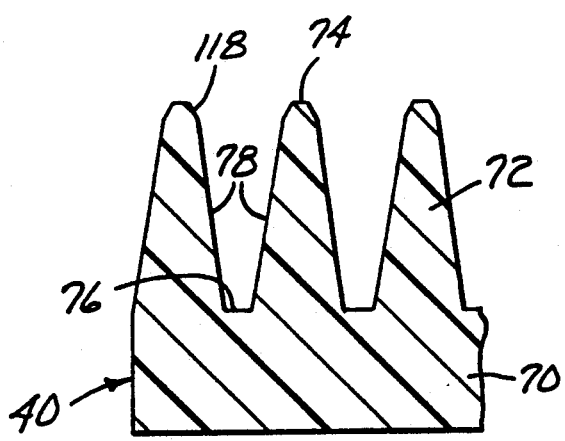
FIG. 5 is an enlarged cross-sectional view illustrating a variation of the intermeshable closure members of the present invention.

It is one of the features of this invention that alignment of the first intermeshable closure member 40 with respect to the second intermeshable closure member 42 may be easily accomplished in multiple positions by aligning any of the elements of the structured surfaces so that the elements intermesh when the structured surfaces are brought together. In the case of Ziploc TM or other similar mechanical fasteners, the closure strips must be precisely aligned in a single relative position. To further facilitate alignment of the elements 72, 92, each ridge 74, 94 may include a portion which may be curved or inclined to form, for example, a chamfered portion 118 as illustrated in FIG. 5.

Figure 6:
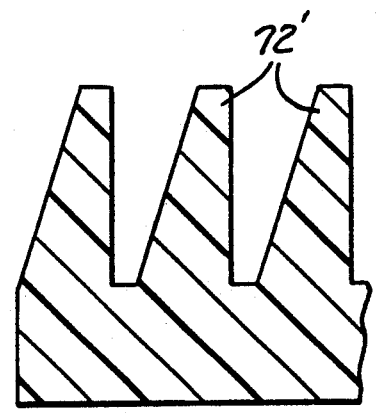
FIG. 6 is a cross-sectional view of another alternate embodiment of the intermeshable closure members of the present invention.

In addition, as illustrated in FIG. 6, the elements 72' of either structured surface may be canted with respect to the perpendicular axis of each element relative to a common plane to provide directionability of adherence and repositionability.

Figure 7:
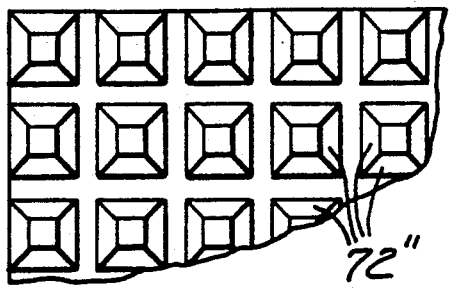
FIGS. 7 and 8 are plan views of alternate embodiments of the intermeshable closure members of the present invention.
Figure 8:
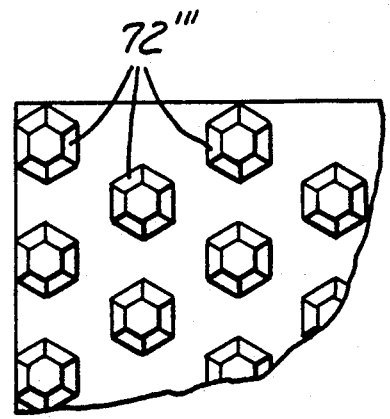

It should be appreciated that the present invention should not be limited to rows of two sided elements arranged side by side, but may include a number of configured elements such as circular or polygonal as long as each has at least one side as, for example, illustrated in FIGS. 7 and 8 which may be used for adherence. In FIG. 7, rows of four sided elements 72" are arranged so that they may mesh with corresponding elements when brought into contact therewith. Also, as illustrated in FIG. 8, a plurality of six sided elements 72''' may be arranged adjacent one another. Alternatively, the elements of one intermeshable closure member may be positive elements and the elements of the other intermeshable closure member may be negative elements so that the positive elements may mesh with the negative elements to adhere thereto.

The particular material used for the first and second intermeshable closure members 40 and 42 may vary and is not essential to the present invention. Polymeric materials, such as commercially available acrylics, vinyls, polyethylenes, ethyl vinyl acetates, poly vinyl chlorides, polypropylenes, kraton rubbers, polycarbonates, and blends thereof have been found to be useful. Normally, the manufacturers of this product will select the best commercially available material based upon price, application and manufacturing process. In addition, for specialty applications, materials which are biodegradable, conductive or magnetic may also be useful.

There are several ways to mass produce the intermeshable closure members of the present invention which are well known to those skilled in the art, for example, as illustrated in U.S. Pat. Nos. 3,689,346 (Rowland), 4,244,683 (Rowland), 4,576,850 (Martens) and U.K. Patent Application No. GB 2,127,344 A (Pricone et al.), the disclosures of which are hereby incorporated by reference. Alternatively, the structured surfaces of this invention may be extruded or embossed. More particularly, the structured surfaces, such as shown in FIG. 4, may be extruded as an integral portion of the container itself, or embossed directly on surfaces of the container, rather than constructed as separate members that are mounted on the container. The particular manufacturing process is not essential to the present invention, and is a matter of choice based upon economics and availability. Presently, prototypes have been made by compression molding sheets of polymethyl methacrylate (PMMA), polyvinyl chloride (PVC), polyethylene, polypropylene, and kraton rubbers and by extrusion embossing.

The thickness of the first and second intermeshable closure members 40 and 42 may vary depending upon the particular application. Thus, the first and second intermeshable closure members 40 and 42 may be formed of a thin, flexible sheet or film so that it can be flexed to allow separation and repositioning of the first and second intermeshable closure members.

Referring now again to the embodiment of the invention shown in FIG. 2, the first and second intermeshable closure members 40 and 42 are mounted with the edges and troughs extending generally parallel to the edges 44, 46. The first and second intermeshable closure members may be secured to each other when brought into contact, such as when the front panel 12 and the back panel 14 of the bag are pressed together in directions 52 and 54. When it is desired to open the bag, the front panel and the back panel of the bag are grasped and pulled apart in directions 56 and 58. The first and second intermeshable closure members are peeled apart, starting at their respective longitudinal edges 44 and 46 closest to opening 22 and proceeding transversely across the intermeshable closure members towards the opposite longitudinal edges.

Figure 9:
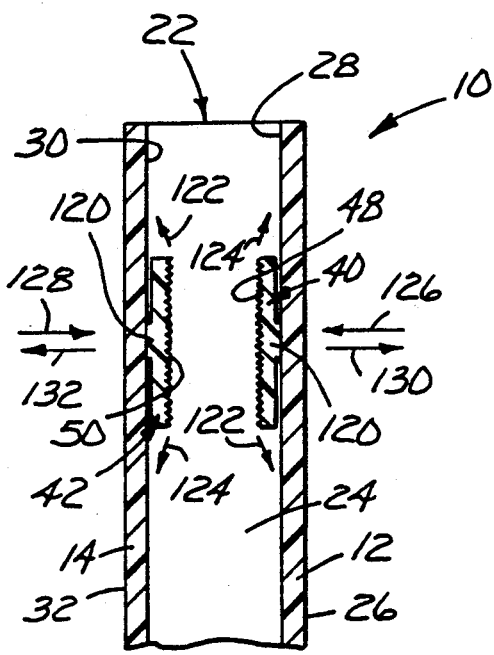
FIG. 9 is an enlarged partial cross sectional view of the container of FIG. 1 with a second embodiment of the intermeshable closure members.

In FIG. 9, an alternate embodiment of the invention is shown in which first intermeshable closure member 40 is mounted on the back surface 28 of the front panel 12, generally at the transverse midpoint (as at 120) of the intermeshable closure member. Similarly, second intermeshable closure member 42 is mounted generally along its transverse midpoint 121 to front surface 30 of back panel 14. This arrangement enables the first and second intermeshable closure members to adjust their positions with respect to the front and back panels in directions 122 and 124.

During use, the first and second intermeshable closure members may be pressed together in directions 126 and 128 and secured together as herein described to join the front panel 12 to the back panel 14 and enclose the opening 22. When it is desired to open the bag, the front panel and the back panel may be grasped and pulled apart in directions 130 and 132. As the first intermeshable closure member and the second intermeshable closure members are pulled apart, they shift portions about mounted portions 120 and 121 so that the first and second closure members must be separated in opposing directions. In other words, the first and second intermeshable closure members are separated in a perpendicular lift off mode, as opposed to a peel mode as in the embodiment shown in FIG. 2.

Figure 10:
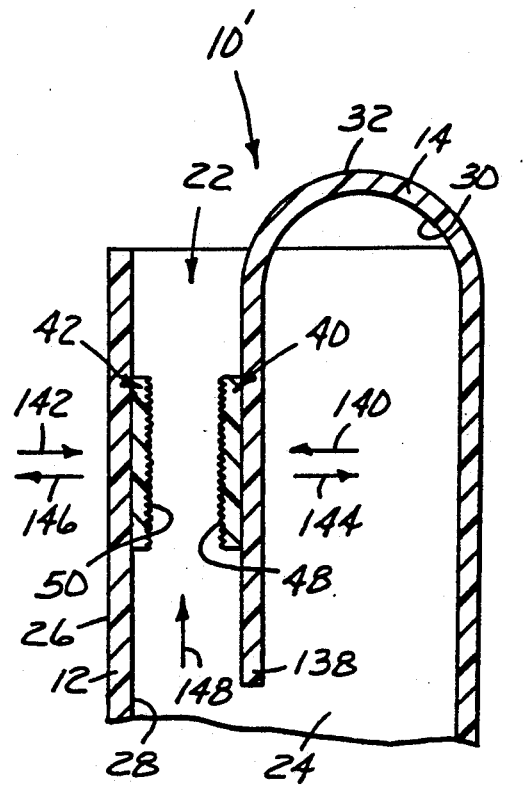
FIG. 10 is an enlarged partial cross sectional view of an alternate embodiment of the container of FIG. 1 with a third embodiment of the intermeshable closure members of this invention.

FIG. 10 illustrates yet another alternate embodiment 10' of the invention in which the first intermeshable closure member 40 is mounted on the back surface 28 of the front panel 12 and the second intermeshable closure member 42 is mounted on the back surface 32 of the back panel 14. The first and second closure members 40 and 42 may be mounted to the front and back bag panels as shown in either FIGS. 2 or 9, or may be mounted to the bag panels across the full surfaces 71 and 91 of the closure members or in any other desired pattern or arrangement. The back panel 14 extends beyond the front panel 12 to form flap 138. The front panel and the back panel are joined together by folding over the flap and inserting it into the opening 22 of the bag so that the first intermeshable closure member (40) and the second intermeshable closure member (42) are placed in contact with each other. When the first and the second intermeshable closure member are pressed together in directions 140 and 142 the front panel is joined to the back panel and the opening 22 is enclosed. The bag may be opened by grasping the front panel and the back panel and pulling them apart in directions 144 and 146. In this configuration, the contents (not shown) of the bag are received within the pocket created by the flap 138 and exert a force against the first intermeshable closure member and the second intermeshable closure member in direction 148 (i.e. in a shear mode).

Figure 11:
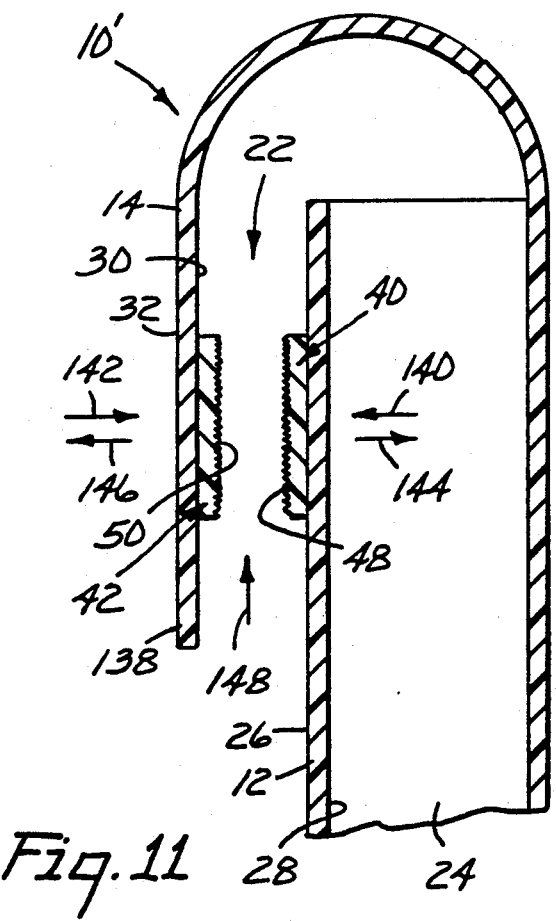
FIG. 11 is an enlarged partial cross sectional view of an alternate embodiment of the container of FIG. 10 with a fourth embodiment of the intermeshable closure members mounted in alternate locations.

FIG. 11 illustrates an alternate embodiment 10' of the bag of FIG. 10 in which first intermeshable closure member 40 is mounted on the front surface 26 of the front panel 12 and the second intermeshable closure member 42 is mounted on the front surface 30 of the back panel 14. As in the embodiment shown in FIG. 10, the first and second closure members may be mounted to the front and back bag panels as shown in either FIGS. 2 or 9, or may be mounted to the bag panels across the full surfaces 71 and 91 of the closure members or any other desired pattern or arrangement. The back panel 14 extends beyond the front panel 12 to form flap 138, as in FIG. 10. The first and second intermeshable closure strips may be brought into contact with each other by folding over the flap as shown in FIG. 11 and separated as hereinabove described.

FIG. 12 illustrates a particular embodiment of the invention in conjunction with generally rectangular box 160 having opening 170. End flaps 162 and 164 and side flaps 166 and 168 may be folded over to enclose the opening 170 in a manner known in the art. Bag 172 is contained within the box and includes front panel 174, back panel 176, and a pair of side panels 178 (only one of which is shown in FIG. 12). The front, back and side panels are joined along adjacent edges to form the bag. In addition, a portion of the upper seam 180 is joined, with the remaining portion of the upper seam forming opening 182. Alternatively, opening 182 may be formed at an intermediate location on upper seam 180, with joined portions on either side thereof. First intermeshable closure member 184 is mounted on the inner surface of the front panel 174 and second intermeshable closure member 186 is mounted on an inner surface of the back panel 176. Preferably, the first intermeshable closure member 184 and the second intermeshable closure member 186 are mounted in the manner shown in FIG. 2 and previously discussed herein. The opening 182 may be enclosed by joining the front panel to the back panel and securing the first intermeshable closure member to the second intermeshable closure member by pressing the front panel and the back panel together in directions 190 and 192. The bag 174 may be reopened by separating the first intermeshable closure member from the second intermeshable closure member as previously described.

The embodiment shown in FIG. 12 is particularly adapted for a package designed to contain a quantity of a flowable article in the bag and requiring the box 160 for support during storage and while dispensing the contents of the bag through the opening 182. Specifically, such a configuration is particularly adapted for use as a package for breakfast cereals or the like as is commonly marketed in supermarkets, grocery stores etc. In existing cereal packages, the flaps of the box portion of the package are sealed by a permanent adhesive and must be forced apart to open the box. A bag is located in the box with an upper seam that is permanently bonded along the full length of the upper seam. Thus, the bag must be torn or severed to open the bag and provide access to the contents of the bag. The irregular opening in the bag portion does not consistently provide an effective pouring spout, nor may the opening be reclosed, adversely affecting the storage life of the contents of the package once the opening is made. A mechanical fastener, such as the Ziploc ™ closure, may be employed, but is subject to the limitations previously discussed.

In the present invention, opening 182 is conveniently preformed and constructed to serve as a pouring spout for dispensing the flowable contents of the bag. The bag may be repeatedly reclosed to protect the freshness of the contents of the bag. The performance of the first and second intermeshable closure members is not adversely affected by extremes in temperatures or long storage periods. Further, the first and second intermeshable closure members are not adversely affected by particulates frequently generated by cereals or the like.

Figure 13:
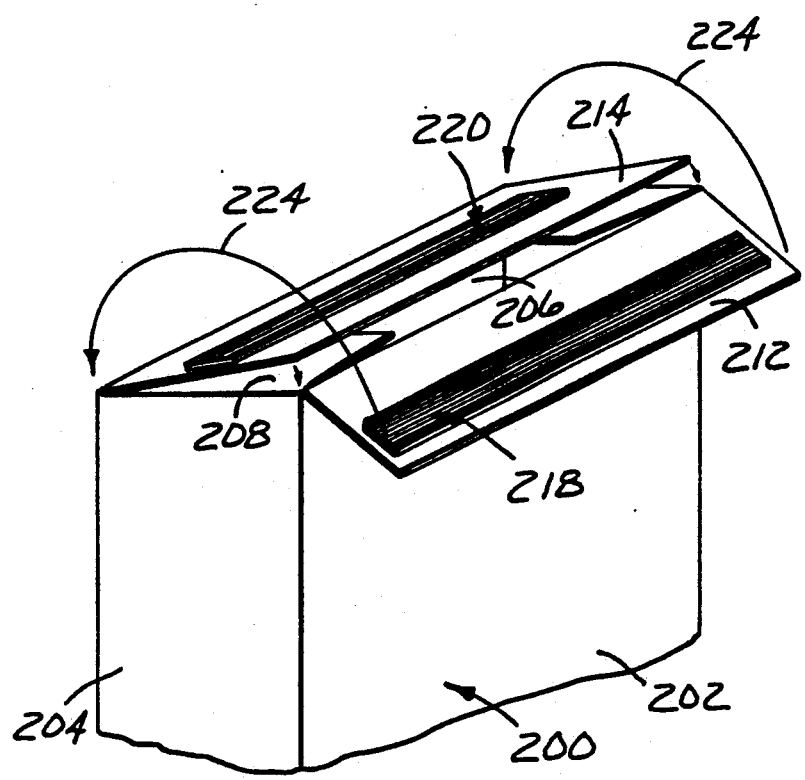
FIG. 13 is an isometric view of a portion of a box with intermeshable closure members according to this invention.

FIG. 13 illustrates another embodiment of the invention in which the container is in the form of generally rectangular box 200 including end panels 204 and side panels 202 (only one of each is shown in FIG. 13) forming opening 206 in the top thereof. End flaps 208 and 210 are each attached to one of the end panels 204 of the box and side flaps 212 and 214 are each attached to one of the side panels 202. The end flaps 208 and 210 may be folded over in the manner shown in FIG. 13. The side flaps 212 and 214 may likewise be folded over in the directions of the arrows in FIG. 13 to enclose opening 206. First intermeshable closure member 218 is mounted on the inner surface of side flap 212. Second intermeshable closure member 220 is mounted on the outer surface of side flap 214 and is situated so as to contact first intermeshable closure member 218 when the side flaps are folded to enclose the opening 206. The first and second intermeshable closure members secure the side flaps 212 and 214 together, yet enable the flaps to be unfolded and the box opened and subsequently reclosed.

In each of the embodiments shown herein, the first and second intermeshable closure members may be particularly adapted for the configuration of the container. For instance, the size, shape, angle, spacing and orientation of the elements of the structured surfaces may be varied as is found effective in a particular application. The following are examples of particular constructions according to the present invention:

EXAMPLE 1

A container was constructed in the form of a bag as shown in FIG. 1 from 0.002 inch (0.05 mm) thick polyethylene film. First and second closure members were constructed in the form of strips 0.50 inch (1.27 cm) wide having structured surfaces as shown in FIG. 4 and mounted to the bag as shown in FIG. 2. The elements were constructed with sides tapered at 10° and having a height of 0.020 inches (0.51 mm).

EXAMPLE 2

A container in the form of a bag as shown in FIG. 1 was constructed from 0.0015 inches (0.38 mm) poly vinyl chloride film. First and second closure members were constructed in the form of strips 0.50 inch (127 cm) wide having structured surfaces as shown in FIG. 4 and mounted to the bag as shown in FIG. 9. The elements were constructed with sides tapered at 14° and having a height of 0.013 inches (0.33 mm).

EXAMPLE 3

A container in the form of a bag as shown in FIG. 10 was constructed from 0.002 inches (0.05 mm) polypropylene film. First and second closure members were constructed in the form of strips 0.50 inches (1.27 cm) wide having structured surfaces as shown in FIG. 4 and mounted to the bag as shown in FIG. 10. The elements were constructed with sides tapered at 6° and having a height of 0.020 inches (0.51 mm).

Table 1 presents the results of test on samples of the intermeshable closure of this invention constructed of various materials and having various configurations designed to enhance the frictional force of adherence of the intermeshable closure members in peel, shear and perpendicular lift-off mode.

The test procedures for measuring the peel force in Table 1 included providing a first sample 1.0 inch × 3.0 inches (2.5 × 7.6 cm) with the ridges and grooves extending longitudinally and a second sample 1 inch by 1 inch (2.5 × 2.5 cm). The first and second sample were pressed together by hand and then mechanically rolled down by a 4.5 pound (9.9 kg) mass. A tab of No. 369 brand tape available from Minnesota Mining and Manufacturing Co. of St. Paul, Minn. was attached to each of the samples. The samples were then peeled apart at a speed of 12 inches (30.5 cm)/minute and the peak force of resistance recorded. The test was conducted with the samples separated parallel to the ridges and grooves, as well as transverse thereto.

The test procedures for measuring the shear force in Table 1 included providing a first sample 1.0 inch × 1.5 inch (2.5 × 3.8 cm) with the ridges and grooves extending longitudinally and a second sample 1 inch by 1.5 inch (2.5 × 3.8 cm). The first and second samples were aligned with a 0.50 inch (1.27 cm) overlap and pressed together by hand and then mechanically rolled down by a 4.5 pound (9.9 kg) mass. A tab of No. 369 brand tape available from Minnesota Mining and Manufacturing Co. of St. Paul, Minn. was attached to each of the samples. The samples were then separated in a shear mode in both a longitudinal and transverse orientation and the peak force of resistance recorded.

The test procedures for measuring perpendicular lift-off force included providing a first sample 1.0 inch × 1.0 inch (2.5 × 2.5 cm) with the ridges and grooves extending longitudinally and a second sample 1.0 inch by 1.0 inch (2.5 × 2.5 cm). The first and second samples were each mounted on an aluminum block by using No. 411 double coated pressure sensitive ad, aligned and compressed with a pressure of 100 p.s.i. (7031 g/cm$^2$) in a compression cage. The samples were then separated in a perpendicular lift off mode and the peak force of resistance recorded.

The present invention has now been described with reference to several embodiments thereof. It will be apparent to those skilled in the art that many changes can be made in the embodiments descibed without departing from the scope of the present invention. Thus, the scope of the present invention should not be limited

TABLE 1

| Closure Material | Angle | Depth | Longitudinal Peel Strength | Transverse Peel Strength | Longitudinal Shear Strength | Transverse Shear Strength | Perpendicular Lift-Off Strength |
| --- | --- | --- | --- | --- | --- | --- | --- |
| 1. Polyethylene | .33 | 13 mil | .39 | 3.9 | 0 | 2857 | 717.0 |
| 2. Polyethylene | .51 | 20 mil | 11.8 | 3.9 | 4643 | 2500 | 234.0 |
| 3. Polyethylene | .51 | 20 mil | 8.7 | 36.6 | 3571 | 4643 | 33.7 |
| 4. Polyethylene | .38 | 15 mil | 10.6 | 40.2 | 6072 | 5357 | 47.1 |
| 5. Polyethylene | .51 | 20 mil | 7.9 | 20.9 | 3214 | 5357 | 26.7 |
| 6. Polyethylene | .38 | 15 mil | 5.5 | 10.6 | 357 | 5000 | 206.0 |
| 7. Polypropylene | .33 | 13 mil | 0 | 0 | 0 | 357 | 0 |
| 8. Polypropylene | .51 | 20 mil | 3.1 | 32.3 | 714 | 2500 | 149.4 |
| 9. Polypropylene | .38 | 15 mil | 3.5 | 29.1 | 714 | 4643 | 119.0 |
| 10. Polypropylene | .51 | 20 mil | 5.1 | 37.4 | 1071 | 3929 | 62.6 |
| 11. Polypropylene | .51 | 20 mil | 4.3 | 42.9 | 1429 | 1429 | 75.9 |
| 12. Polypropylene | .38 | 15 mil | 1.2 | 70.5 | 357 | 7857 | 42.2 |
| 13. Polyvinyl Chloride | .61 | 20 mil | 35.0 | 48.8 | 2143 | 1429 | 158.2 |
| 14. Polyvinyl Chloride | .33 | 13 mil | 46.1 | 18.5 | 6072 | 2143 | 351.5 |
| 15. Polyvinyl Chloride | .38 | 15 mil | 31.1 | 65.8 | 1786 | 714 | 64.7 |
| 16. Polyvinyl Chloride | .51 | 20 mil | 44.1 | 51.2 | 4643 | 1071 | 139.0 |
| 17. Polyvinyl Chloride | .51 | 20 mil | 31.9 | 17.7 | 1429 | 1071 | 80.8 |
| 18. Polyvinyl Chloride | .38 | 15 mil | 29.1 | 29.5 | 3572 | 2143 | 211.0 |

Note:
Samples 1-6 were constructed of PAX Plus 3201 Brand polyethylene available from Allied Corporation of Baton Rouge, Louisiana.
Samples 7-12 were constructed of 3374 Brand polypropylene available from Fina Oil and Chemical Company of Westchester, Pennsylvania.
Samples 13-18 were constructed of 2215-80 Brand polyvinyl chloride available from Dexter Corporation of Pineville, North Carolina.

to the structures described in this application, but only by structures described by the language of the claims and the equivalents of those structures.

What is claimed is:

1. A receptacle having an opening providing access to an interior of the receptacle and including a first receptacle portion and a second receptacle portion that enclose the opening when joined together, said receptacle further including a closure for securing said first receptacle portion and said second receptacle portion together, said closure comprising a first closure member adapted for mounting on said first receptacle portion and a second closure member adapted for mounting on said second receptacle portion; wherein said first closure member and said second closure member each have a structured surface and a back surface behind said structured surface having no greater extent than said structured surface with said structured surfaces being brought into contact with each other when said first and second receptacle portions are brought together, said structured surfaces including a plurality of solid elements arranged to form grooves extending in a direction along said opening, and the back surface of each of said first and second closure members is provided with an offset strip that extends along a portion of the back surface, the offset strips each having a raised surface, and the raised surfaces are mounted to said first and second receptacle portions, respectively, in the direction of said grooves while another portion of the back surface of each of said first and second closure members is free from connection to and spaced from said first and second receptacle portions, respectively, so that said first and second closure members are relatively movably connected to said first and second receptacle portions to be pivotal about an axis of connection along the direction of said grooves and to effectively change a separation mode of the closure from that which occurs when such relative movement is not permitted.

2. The receptacle of claim 1, wherein said grooves of said structured surfaces are defined by ridges which run continuously in the direction of said grooves.

3. The receptacle of claim 1, wherein said grooves of said structured surfaces are defined by rows of discrete elements along the direction of said grooves.

4. The receptacle of claim 1, further wherein said strips are provided at edges of said first and second closure members closest to said opening, so that said receptacle may be opened by peeling said first closure member from said second closure member.

5. The receptacle of claim 1, further wherein said strips are provided on the back surfaces of said first and second closure members so that a void is created between a free portion on both sides of each of said strips and said first and second receptacle portions, so that said first and second closure members may shift about the axis of connection defined by said strips, and said first closure member is separated from said second closure member by pulling said first closure member away from said second closure member.

6. The receptacle of claim 1, further wherein said solid elements, provided on said structured surfaces of said first and second closure members, are tapered elements, each of said solid elements having at least one side inclined relative to a common plane of each of said structured surfaces at an angle $\beta$ sufficient to form a taper such that each element may mesh with at least one corresponding element of the other of said structured surfaces when brought into contact with said corresponding element and adhere thereto at least partially because of the frictional force of adherence of said contacting tapered sides, and the tangent of the half angle $\beta$ of said tapered sides of said elements is no greater than the coefficient of friction $\mu$ of the material of the contacting tapered sides.

7. A receptacle having an opening providing access to an interior of the receptacle and including a first receptacle portion and a second receptacle portion that enclose the opening when joined together, said receptacle further including a closure for securing said first receptacle portion and said second receptacle portion together, said closure comprising a first closure member adapted for mounting on said first receptacle portion and a second closure member adapted for mounting on said second receptacle portion; wherein said first closure member and said second closure member each have a structured surface and a back surface with said structured surfaces being brought into contact with each other when said first and second receptacle portions are brought together, said structured surfaces including a plurality of solid elements arranged to form grooves extending in a direction along said opening, said grooves of said structured surfaces are defined by rows of discrete elements along the direction of said grooves, and the back surfaces of said first and second closure members are mounted to said first and second receptacle portions, respectively, in the direction of said grooves by a portion of the back surface of each of said first and second closure members while another portion of the back surface of each of said first and second closure members is free from connection to said first and second receptacle portions, respectively, whereby said first and second closure members are relatively movably connected to said first and second receptacle portions about an axis of connection along the direction of said grooves.

8. A receptacle having an opening providing access to an interior of the receptacle and including a first receptacle portion and a second receptacle portion that enclose the opening when joined together, said receptacle further including a closure for securing said first receptacle portion and said second receptacle portion together, said closure comprising a first closure member adapted for mounting on said first receptacle portion and a second closure member adapted for mounting on said second receptacle portion; wherein said first closure member and said second closure member each have an interengagement closure surface and a back surface with said interengagement closure surfaces being brought into contact with each other when said first and second receptacle portions are brought together to act as said closure for securing said first and second receptacle portions together and the back surfaces of said first and second closure members are mounted to said first and second receptacle portions, respectively, in a direction along said opening by a first portion of the back surface of each of said first and second closure members while other portions of the back surface on both sides of each of said first portions of each of said first and second closure members are free from connection to said first and second receptacle portions, respectively, so that said first and second closure members are relatively movably connected to said first and second receptacle portions to pivot about an axis of connection of the said first portions along the direction of said opening, and to effectively change the separation mode of the closure from that which occurs when such relative movement is not permitted.

9. The receptacle of claim 8, further wherein said first portion of the back surface of each of said first and second closure members comprises an offset strip which is connected to said first and second receptacle portions, respectively, said offset strips creating a void on both sides thereof between the free portions of each of said first and second closure members and said first and second receptacle portions.

* * * * *